(12) United States Patent
Ishida

(10) Patent No.: US 9,780,708 B2
(45) Date of Patent: Oct. 3, 2017

(54) CONTROL DEVICE AND METHOD FOR STEPPER MOTOR THAT ENSURE IMPROVED PERFORMANCE OF STEPPER MOTOR DURING ACTIVATION PERIOD

(71) Applicant: KYOCERA Document Solutions Inc., Osaka (JP)

(72) Inventor: Hirotaka Ishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/154,716

(22) Filed: May 13, 2016

(65) Prior Publication Data
US 2016/0352270 A1 Dec. 1, 2016

(30) Foreign Application Priority Data
May 25, 2015 (JP) .................. 2015-105701

(51) Int. Cl.
*H02P 8/00* (2006.01)
*G05B 13/00* (2006.01)
*H02P 8/04* (2006.01)
*H02P 8/18* (2006.01)
*H02P 8/22* (2006.01)
*H02P 29/50* (2016.01)

(52) U.S. Cl.
CPC .................. *H02P 8/04* (2013.01); *H02P 8/18* (2013.01); *H02P 8/22* (2013.01); *H02P 29/50* (2016.02)

(58) Field of Classification Search
CPC ........................................................ H02P 8/04
USPC .......................................................... 318/696
See application file for complete search history.

(56) References Cited

U.S. PATENT DOCUMENTS

| 4,600,868 A * | 7/1986 | Bryant | G05B 19/416 318/561 |
| 2010/0320955 A1* | 12/2010 | Ando | H02P 8/38 318/696 |

FOREIGN PATENT DOCUMENTS

| CN | JP 7-237789 | 9/1995 |
| CN | JP 11-85283 | 3/1999 |

* cited by examiner

*Primary Examiner* — Bentsu Ro
*Assistant Examiner* — Zemenay Truneh
(74) *Attorney, Agent, or Firm* — Stein IP, LLC

(57) ABSTRACT

A control device for a stepper motor drives in a 1-2-phase excitation method in response to an input of a drive signal. The control device includes a control signal generating unit and a drive signal generating unit. The control signal generating unit generates a pulsed control signal. The drive signal generating unit generates the drive signal for rotating by a predetermined step angle every time the control signal is input. The predetermined step angle is a half of a step angle of a 2-phase excitation method. The control signal generating unit configures a higher pulse rate of a first to an n-th (n is an integer equal to or more than 2 and equal to or less than 3) control signals in an activation period of the stepper motor than a pulse rate of the control signals following the n-th control signal.

7 Claims, 14 Drawing Sheets

Before first control signal is input

First control signal is input

Second control signal is input

Before first control signal is input

First control signal is input

Second control signal is input

Before first control signal is input

First control signal is input

Magnetic force of A-phase magnetic pole : Magnetic force of B-phase magnetic pole = 3/4 : 1/4

Magnetic force of /A-phase magnetic pole : Magnetic force of /B-phase magnetic pole = 3/4 : 1/4

Second control signal is input

Magnetic force of           Magnetic force of
A-phase magnetic pole  :  B-phase magnetic pole    = 2/4 : 2/4

Magnetic force of           Magnetic force of
/A-phase magnetic pole :  /B-phase magnetic pole   = 2/4 : 2/4

CONTROL DEVICE AND METHOD FOR STEPPER MOTOR THAT ENSURE IMPROVED PERFORMANCE OF STEPPER MOTOR DURING ACTIVATION PERIOD

INCORPORATION BY REFERENCE

This application is based upon, and claims the benefit of priority from, corresponding Japanese Patent Application No. 2015-105701 filed in the Japan Patent Office on May 25, 2015, the entire contents of which are incorporated herein by reference.

BACKGROUND

Unless otherwise indicated herein, the description in this section is not prior art to the claims in this application and is not admitted to be prior art by inclusion in this section.

As a technique to which a typical stepper motor is applied, for example, there is proposed an automatic document feeding device that includes a paper sheet feeder, a conveying unit, a drive transmission unit, a stepper motor, and a control unit. The paper sheet feeder feeds sheets of original documents one by one. The conveying unit conveys the fed original document to an exposure position of a copier. The drive transmission unit transmits a driving power to the conveying unit. The stepper motor provides the drive transmission unit with the driving power. The control unit drives the stepper motor by the number of pulses corresponding to a backlash from this stepper motor to the conveying unit and the number of the pulses required for a phase matching of the stepper motor before a conveyance of the original document.

There is proposed a driving device for switching position that switches at least two positions as another example. The driving device for switching position includes: a stepper motor; a drive shaft driven by the stepper motor; a turning member locked by this drive shaft to integrally turn; a return member turnably located to engage with the turning member; and a bias spring that biases the return member, and configures a longer period until the turning member engages with the return member than an acceleration period at the time point at which the stepper motor starts.

SUMMARY

A control device for a stepper motor according to one aspect of the disclosure drives in a 1-2-phase excitation method in response to an input of a drive signal. The control device includes a control signal generating unit and a drive signal generating unit. The control signal generating unit generates a pulsed control signal. The drive signal generating unit generates the drive signal for rotating by a predetermined step angle every time the control signal is input. The predetermined step angle is a half of a step angle of a 2-phase excitation method. The control signal generating unit configures a higher pulse rate of a first to an n-th (n is an integer equal to or more than 2 and equal to or less than 3) control signals in an activation period of the stepper motor than a pulse rate of the control signals following the n-th control signal.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
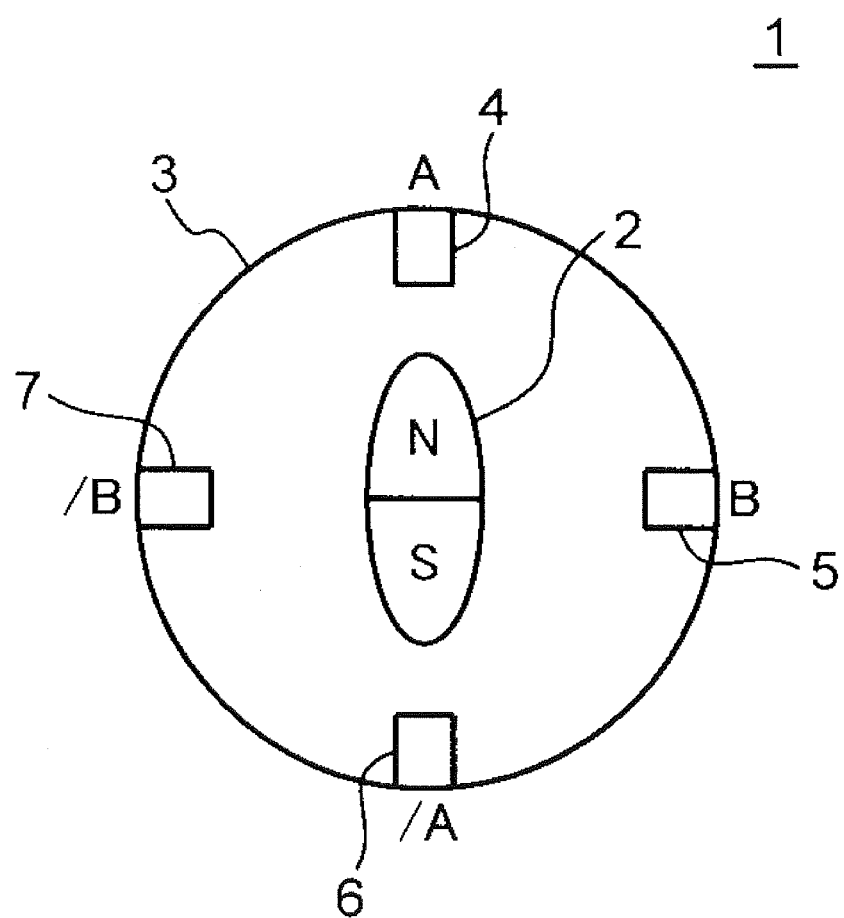
FIG. 1 schematically illustrates an exemplary configuration of a stepper motor according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure with reference to the drawings in detail. FIG. 1 schematically illustrates an exemplary configuration of a stepper motor 1 according to one embodiment of the disclosure. A rotor 2 is a permanent magnet having an N-pole and an S-pole. A stator 3 includes an A-phase magnetic pole 4, a B-phase magnetic pole 5, a /A-phase magnetic pole 6, and a /B-phase magnetic pole 7. The B-phase magnetic pole 5 is located at a position at which the rotor 2 is rotated 90 degrees from a position of the A-phase magnetic pole 4. The /A-phase magnetic pole 6 is located at a position at which the rotor 2 is rotated 90 degrees from a position of the B-phase magnetic pole 5. The /B-phase magnetic pole 7 is located at a position at which the rotor 2 is rotated 90 degrees from a position of the /A-phase magnetic pole 6.

Figure 2:
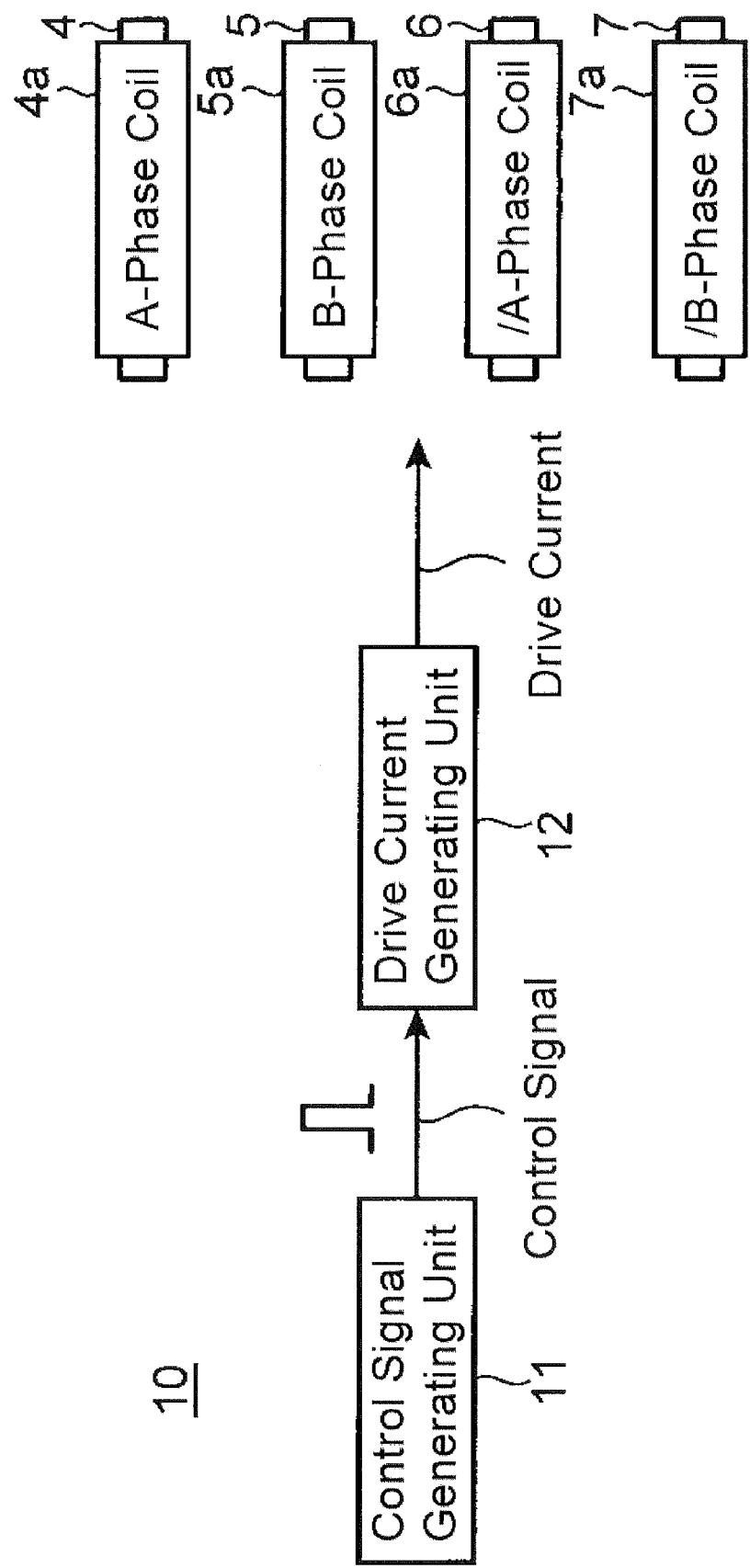
FIG. 2 illustrates a configuration of a stepper motor control device according to the one embodiment in a block diagram.

FIG. 2 illustrates a configuration of a stepper motor control device 10 according to the embodiment in a block diagram. The stepper motor control device 10 includes a control signal generating unit 11 and a drive current generating unit 12.

The control signal generating unit 11 generates a pulsed control signal having a predetermined pulse rate. The pulse rate may be also referred to as a frequency of the control signal.

The drive current generating unit 12 is a concrete example of a drive signal generating unit. The drive current generating unit 12 generates a drive current flowing in an A-phase coil 4a, a B-phase coil 5a, a /A-phase coil 6a, and a /B-phase coil 7a based on the control signal generated by the control signal generating unit 11.

The drive current flowing in the A-phase coil 4a excites the A-phase magnetic pole 4. The drive current flowing in the B-phase coil 5a excites the B-phase magnetic pole 5. The drive current flowing in the /A-phase coil 6a excites the /A-phase magnetic pole 6. The drive current flowing in the /B-phase coil 7a excites the /B-phase magnetic pole 7.

The A-phase coil 4a and the /A-phase coil 6a are connected such that the drive current flowing in the A-phase coil 4a and the drive current flowing in the /A-phase coil 6a have opposite directions. An A-phase and a /A-phase are regarded as one phase.

The B-phase coil 5a and the /B-phase coil 7a are connected such that the drive current flowing in the B-phase coil 5a and the drive current flowing in the /B-phase coil 7a have opposite directions. A B-phase and a /B-phase are regarded as one phase.

When the drive current generating unit 12 is set in a 2-phase excitation mode, the drive current generating unit 12 generates a drive current (a drive current of a 2-phase excitation method) that rotates by a step angle every time the control signal is input. "Rotate by the step angle" herein means rotating the rotor 2 of the stepper motor 1 by the step angle.

Assume that a half of the step angle of the 2-phase excitation method is a predetermined step angle. When the drive current generating unit 12 is set in a 1-2-phase excitation mode, the drive current generating unit 12 generates a drive current (a drive current of a 1-2-phase excitation method) that rotates by the predetermined step angle every time the control signal is input.

Assume that a quarter of the step angle of the 2-phase excitation method is the predetermined step angle. When the drive current generating unit 12 is set in a W1-2-phase excitation mode, the drive current generating unit 12 generates a drive signal (a drive current of a W1-2-phase excitation method) that rotates by the predetermined step angle every time the control signal is input.

The following describes the 2-phase excitation method with reference to FIGS. 2 to 5.

Figure 3:
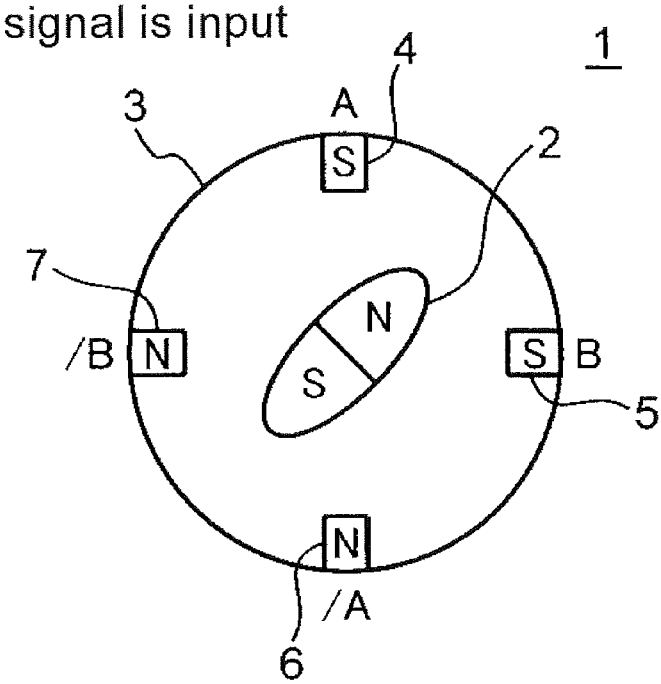
FIG. 3 schematically illustrates a state of the stepper motor when an activation period of the stepper motor that drives in a 2-phase excitation method starts.

FIG. 3 schematically illustrates a state of the stepper motor 1 when an activation period of the stepper motor 1 that drives in the 2-phase excitation method starts. The activation period means a period for which the rotor 2 of the stepper motor 1 starts acceleration from a state where the rotation stops until the rotation speed reaches a target value. The activation period is also referred to as a slow-up period. It is important that a large torque be generated as soon as possible after the activation period starts, in order to shorten a period for which the torque becomes the largest.

The stepper motor 1 is in a state of stop. The drive current generated by the drive current generating unit 12 flows in the A-phase coil 4a, the B-phase coil 5a, the /A-phase coil 6a, and the /B-phase coil 7a such that the A-phase magnetic pole 4 becomes the S-pole, the B-phase magnetic pole 5 becomes the S-pole, the /A-phase magnetic pole 6 becomes the N-pole, and the /B-phase magnetic pole 7 becomes the N-pole, with reference to FIGS. 2 and 3.

Figure 4:
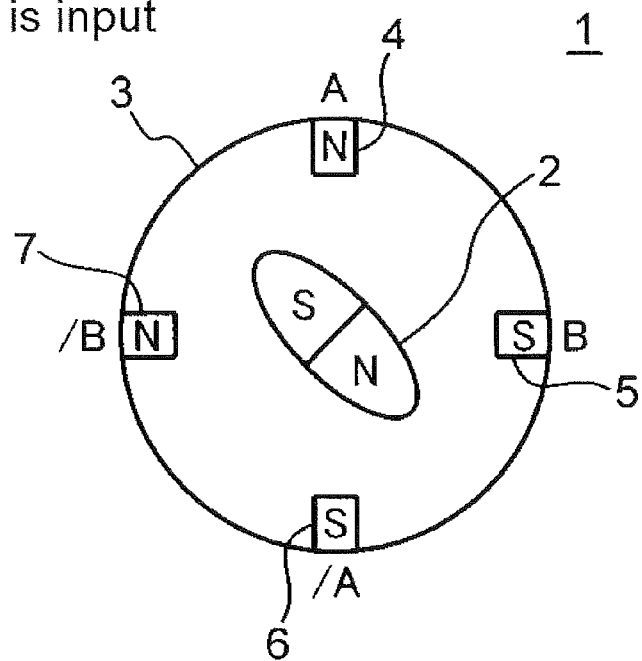
FIG. 4 schematically illustrates a state of the stepper motor that drives in the 2-phase excitation method when the first control signal is input to a drive current generating unit.

FIG. 4 schematically illustrates a state of the stepper motor 1 when the first (primary) control signal is input to the drive current generating unit 12. With reference to FIGS. 2 and 4, assume that the first control signal generated by the control signal generating unit 11 is input to the drive current generating unit 12. This causes the drive current generated by the drive current generating unit 12 to flow in the A-phase coil 4a, the B-phase coil 5a, the /A-phase coil 6a, and the /B-phase coil 7a such that the A-phase magnetic pole 4 becomes the N-pole, the B-phase magnetic pole 5 becomes the S-pole, the /A-phase magnetic pole 6 becomes S-pole, and the /B-phase magnetic pole 7 becomes the N-pole. Accordingly, the rotor 2 rotates by the step angle of 90 degrees from the position illustrated in FIG. 3.

Figure 5:
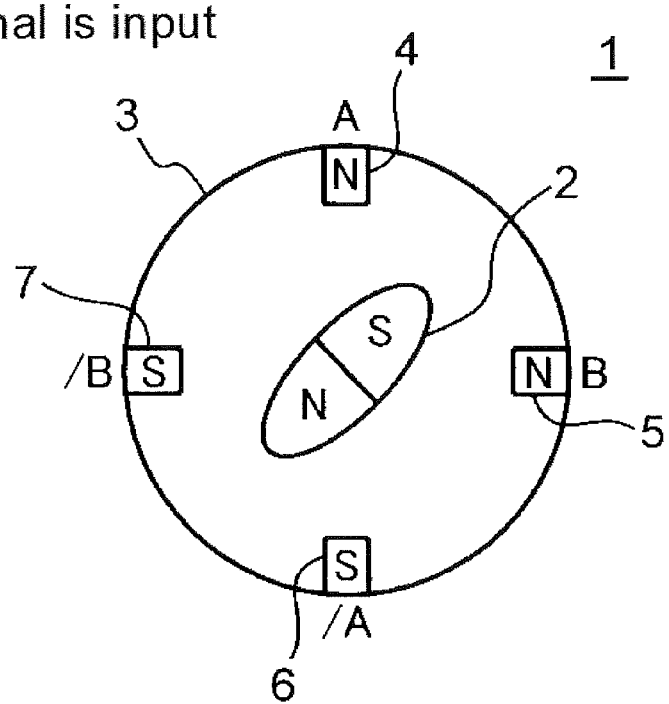
FIG. 5 schematically illustrates a state of the stepper motor that drives in the 2-phase excitation method when the second control signal is input to the drive current generating unit.

FIG. 5 schematically illustrates a state of the stepper motor 1 when the second control signal is input to the drive current generating unit 12. With reference to FIGS. 2 and 5, assume that the second control signal generated by the control signal generating unit 11 is input to the drive current generating unit 12. This causes the drive current generated by the drive current generating unit 12 to flow in the A-phase coil 4a, the B-phase coil 5a, the /A-phase coil 6a, and the /B-phase coil 7a such that the A-phase magnetic pole 4 becomes the N-pole, the B-phase magnetic pole 5 becomes the N-pole, the /A-phase magnetic pole 6 becomes the S-pole, and the /B-phase magnetic pole 7 becomes the S-pole. Accordingly, the rotor 2 rotates by the step angle of 90 degrees from the position illustrated in FIG. 4.

As described above, the 2-phase excitation method is a method that drives the stepper motor 1 with a repeat of the 2-phase excitation and is also referred to as a full-step drive. Among the two phases, the one phase is the A-phase and /the A-phase, and the other phase is the B-phase and the /B-phase.

The following describes the 1-2-phase excitation method with reference to FIG. 2 and FIGS. 6 to 8.

Figure 6:
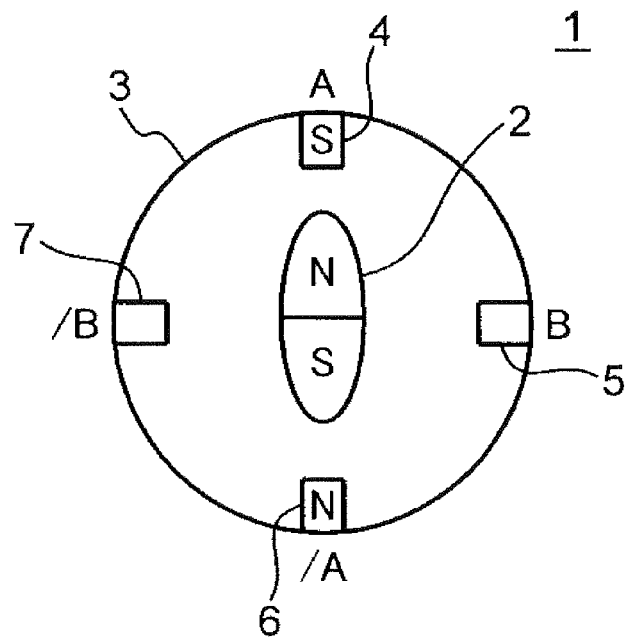
FIG. 6 schematically illustrates a state of the stepper motor when an activation period of the stepper motor that drives in a 1-2-phase excitation method starts.

FIG. 6 schematically illustrates a state of the stepper motor 1 when an activation period of the stepper motor 1 that drives in the 1-2-phase excitation method starts. The stepper motor 1 is in a state of stop. With reference to FIGS. 2 and 6, the drive current generated by the drive current generating unit 12 flows in the A-phase coil 4a and the /A-phase coil 6a such that the A-phase magnetic pole 4 becomes the S-pole, and the /A-phase magnetic pole 6 becomes the N-pole.

Figure 7:
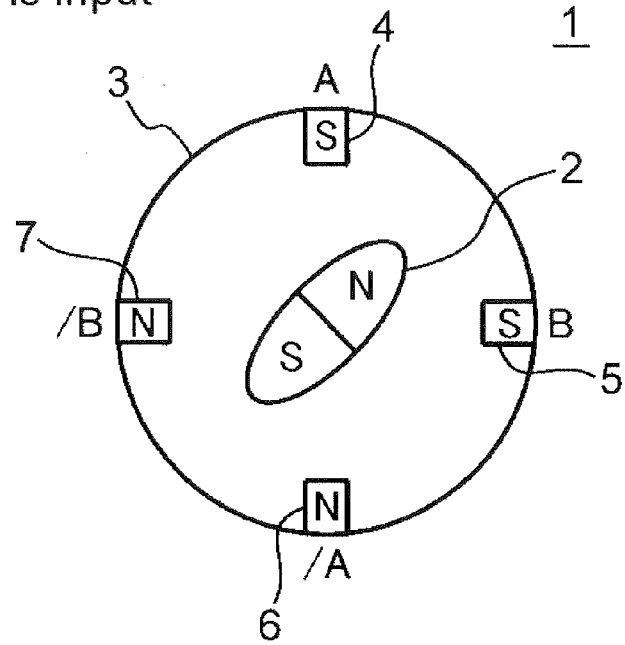
FIG. 7 schematically illustrates a state of the stepper motor that drives in the 1-2-phase excitation method when the first control signal is input to the drive current generating unit.

FIG. 7 schematically illustrates a state of the stepper motor 1 when the first (primary) control signal is input to the drive current generating unit 12. With reference to FIGS. 2 and 7, assume that the first control signal generated by the control signal generating unit 11 is input to the drive current generating unit 12. This causes the drive current generated by the drive current generating unit 12 to flow in the A-phase coil 4a, the B-phase coil 5a, the /A-phase coil 6a, and the /B-phase coil 7a such that the A-phase magnetic pole 4 becomes the S-pole, the B-phase magnetic pole 5 becomes the S-pole, the /A-phase magnetic pole 6 becomes the N-pole, and the /B-phase magnetic pole 7 becomes the N-pole. Accordingly, the rotor 2 rotates by the step angle of 45 degrees from the position illustrated in FIG. 6.

Figure 8:
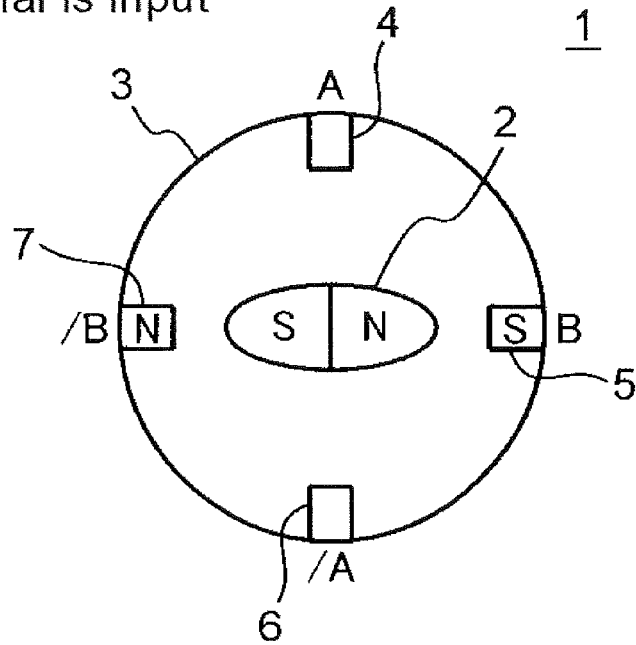
FIG. 8 schematically illustrates a state of the stepper motor that drives in the 1-2-phase excitation method when the second control signal is input to the drive current generating unit.

FIG. 8 schematically illustrates a state of the stepper motor 1 when the second control signal is input to the drive current generating unit 12. With reference to FIGS. 2 and 8, assume that the second control signal generated by the control signal generating unit 11 is input to the drive current generating unit 12. This causes the drive current generated by the drive current generating unit 12 to flow in the B-phase coil 5a and the /B-phase coil 7a such that the B-phase magnetic pole 5 becomes the S-pole, and the /B-phase magnetic pole 7 becomes the N-pole. Accordingly, the rotor 2 rotates by the step angle of 45 degrees from the position illustrated in FIG. 7.

As described above, the 1-2-phase excitation method is a method that drives the stepper motor 1 with an alternate repeat of a 1-phase excitation and the 2-phase excitation. The step angle of the 1-2-phase excitation method is a half of the step angle of the 2-phase excitation method. The 1-2-phase excitation method is also referred to as a half-step drive.

The following describes the W1-2-phase excitation method with reference to FIG. 2 and FIGS. 9 to 11.

Figure 9:
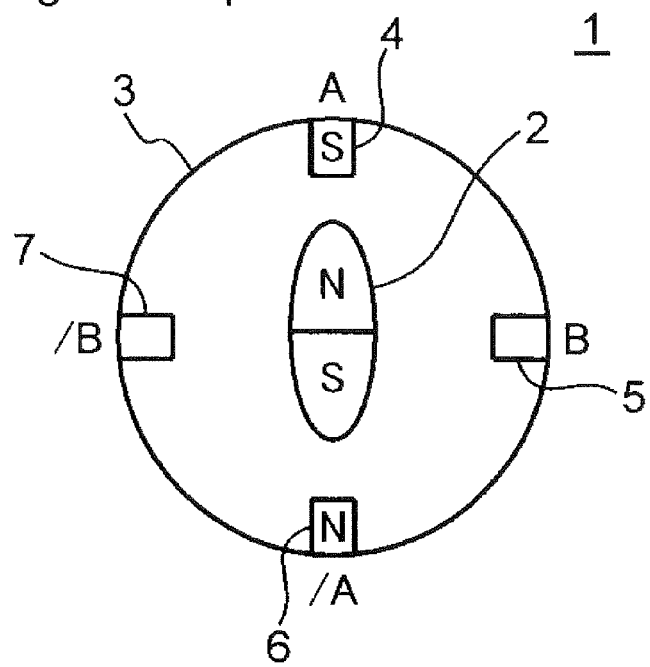
FIG. 9 schematically illustrates a state of the stepper motor when an activation period of the stepper motor that drives in a W1-2-phase excitation method starts.

FIG. 9 schematically illustrates a state of the stepper motor 1 when an activation period of the stepper motor 1 that drives in the W1-2-phase excitation method starts. The stepper motor 1 is in a state of stop. With reference to FIGS. 2 and 9, the drive current generated by the drive current generating unit 12 flows in the A-phase coil 4a and the /A-phase coil 6a such that the A-phase magnetic pole 4 becomes the S-pole, and the /A-phase magnetic pole 6 becomes the N-pole.

Figure 10:
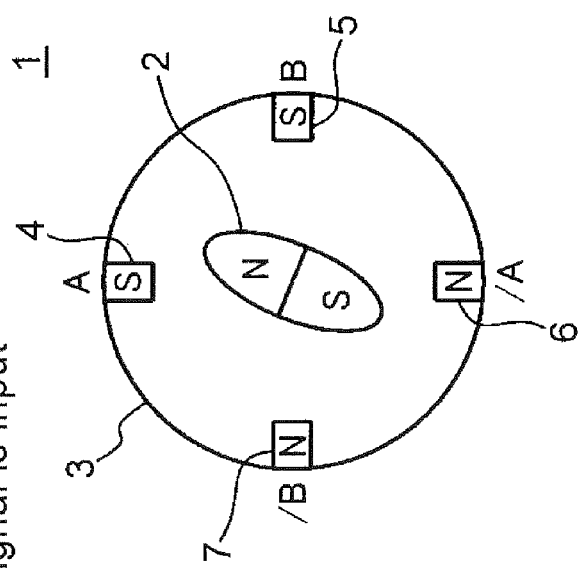
FIG. 10 schematically illustrates a state of the stepper motor that drives in the W1-2-phase excitation method when the first control signal is input to the drive current generating unit.

FIG. 10 schematically illustrates a state of the stepper motor 1 when the first (primary) control signal is input to the drive current generating unit 12. With reference to FIGS. 2 and 10, assume that the first control signal generated by the control signal generating unit 11 is input to the drive current generating unit 12. This causes the drive current generated by the drive current generating unit 12 to flow in the A-phase coil 4a, the B-phase coil 5a, the /A-phase coil 6a, and the /B-phase coil 7a such that the A-phase magnetic pole 4 becomes the S-pole, the B-phase magnetic pole 5 becomes the S-pole, the /A-phase magnetic pole 6 becomes the N-pole, and the /B-phase magnetic pole 7 becomes the N-pole. At this time, the drive current generating unit 12 adjusts an amount of the drive current such that the magnetic force of the A-phase magnetic pole 4:the magnetic force of the B-phase magnetic pole 5 becomes ¾:¼, and the magnetic force of the /A-phase magnetic pole 6:the magnetic force of the /B-phase magnetic pole 7 becomes ¾:¼. Accordingly, the rotor 2 rotates by the step angle of 22.5 degrees from the position illustrated in FIG. 9.

Figure 11:
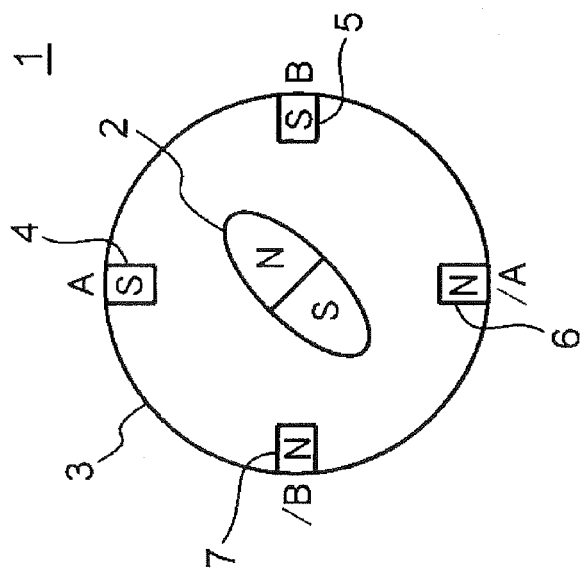
FIG. 11 schematically illustrates a state of the stepper motor that drives in the W1-2-phase excitation method when the second control signal is input to the drive current generating unit.

FIG. 11 schematically illustrates a state of the stepper motor 1 when the second control signal is input to the drive current generating unit 12. With reference to FIGS. 2 and 11, assume that the second control signal generated by the control signal generating unit 11 is input to the drive current generating unit 12. This causes the drive current generated by the drive current generating unit 12 to flow in the A-phase coil 4a, the B-phase coil 5a, the /A-phase coil 6a, and the /B-phase coil 7a such that the A-phase magnetic pole 4 becomes the S-pole, the B-phase magnetic pole 5 becomes the S-pole, the /A-phase magnetic pole 6 becomes the N-pole, and the /B-phase magnetic pole 7 becomes the N-pole. At this time, the drive current generating unit 12 adjusts an amount of the drive current such that the magnetic force of the A-phase magnetic pole 4:the magnetic force of the B-phase magnetic pole 5 is ²⁄₄:²⁄₄, and the magnetic force of the /A-phase magnetic pole 6:the magnetic force of the /B-phase magnetic pole 7 is ²⁄₄:²⁄₄. Accordingly, the rotor 2 rotates by the step angle of 22.5 degrees from the position illustrated in FIG. 10.

As described above, the W1-2-phase excitation method is a method that controls the drive current to cause a much smaller step angle than the step angle of the 1-2-phase excitation method and then drive the stepper motor 1. The step angle of the W1-2-phase excitation method is a quarter of the step angle of the 2-phase excitation method. The W1-2-phase excitation method is also referred to as a micro-step drive.

Figure 12:
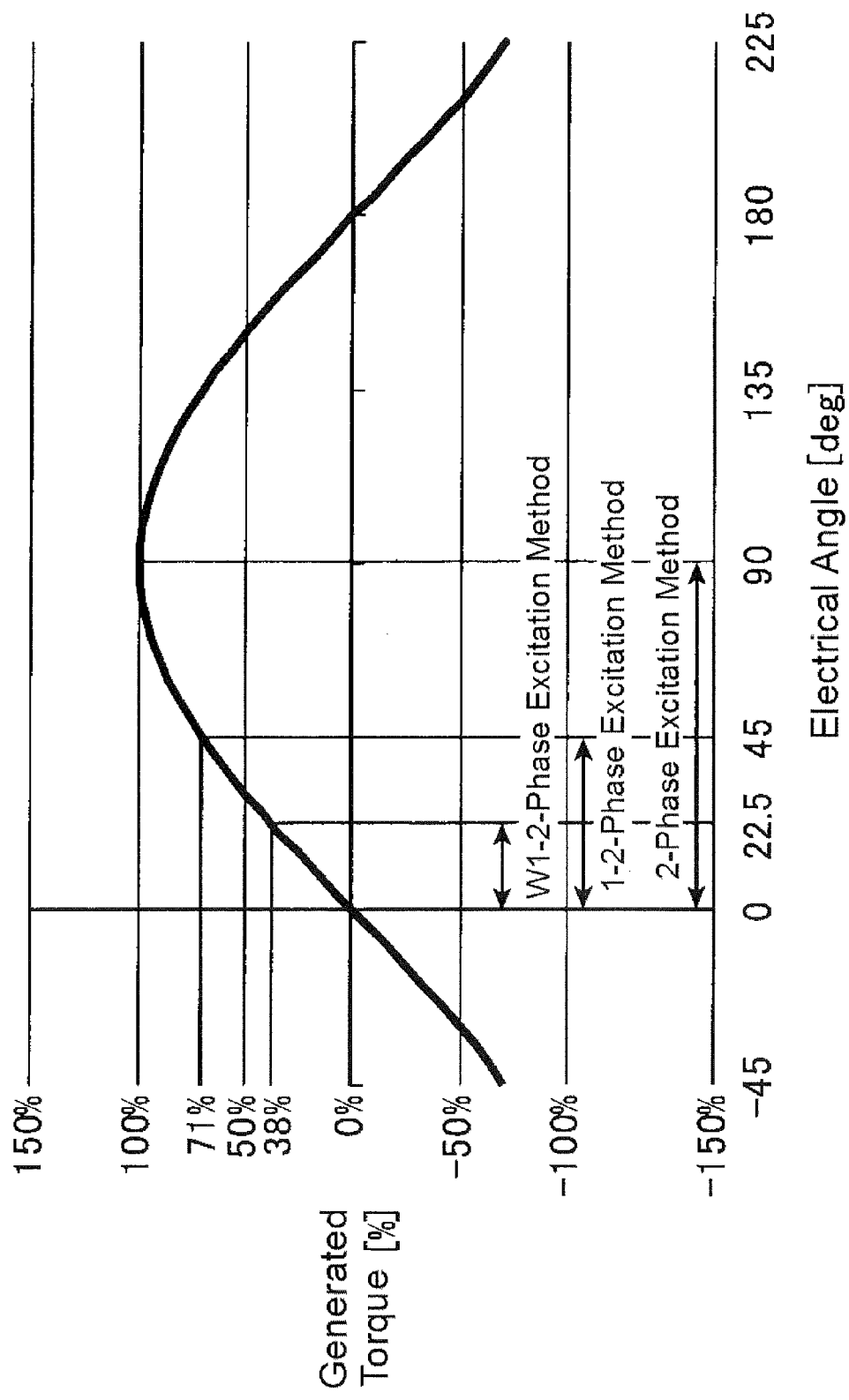
FIG. 12 illustrates a graph showing a relationship between a generated torque of the stepper motor and an electrical angle.

FIG. 12 illustrates a graph showing a relationship between a generated torque of the stepper motor 1 and an electrical angle. The horizontal axis indicates the electrical angle. Its unit is "degree." The vertical axis indicates the torque generated in the stepper motor 1 at each electrical angle. Its unit is "%." Assume that the rotation angle of the rotor 2 is 0 degrees. Assume that when the electrical angle is 90 degrees, the torque generated in the stepper motor 1 is 100%.

The following formula shows the electrical angle according to the embodiment.

$$f_{el} = (n/4) \times f_{mech}$$

Here, fel is electrical angle, fmech is step angle, and n is the number of steps per one rotation during the stepper motor 1 with the full-step drive.

The generated torque indicates a sinusoid having 0% at the electrical angle of 0 degrees, 100% at the electrical angle of 90 degrees, 0% at the electrical angle of 180 degrees, and −100% at the electrical angle of 270 degrees (not illustrated). When the electrical angle is 90 degrees, the generated torque is the maximum.

However, when the rotation angle is changed from 0 degrees due to a rotation of the rotor 2, the generated torque does not become 100% even if the electrical angle is 90 degrees. For example, when the rotation angle of the rotor 2 is changed into 60 degrees from 0 degrees in the state where the electrical angle is 90 degrees, a relative angle formed between the coil (the A-phase coil 4a, the B-phase coil 5a, the /A-phase coil 6a, and the /B-phase coil 7a) and the rotor 2 is 30 degrees. This causes the torque to become 50% even when the electrical angle is 90 degrees.

Every time the control signal generated by the control signal generating unit 11 is input to the drive current generating unit 12, the phase of the stepper motor 1 is switched, and the electrical angle is changed. In the state where the stepper motor 1, which is at a start of the activation period illustrated in FIG. 3, is stopped, when the first control signal is input to the drive current generating unit 12, the electrical angle becomes 90 degrees in the 2-phase excitation method. In the state where the stepper motor 1, which is at the start of the activation period illustrated in FIG. 6, is stopped, when the first control signal is input to the drive current generating unit 12, the electrical angle becomes 45 degrees in the 1-2-phase excitation method. In the state where the stepper motor 1, which is at the start of the activation period illustrated in FIG. 9, is stopped, when the first control signal is input to the drive current generating unit 12, the electrical angle becomes 22.5 degrees in the W1-2-phase excitation method. While in this embodiment the electrical angle matches the step angle, these may not match one another sometimes.

If the rotor 2 does not rotate, the electrical angle becomes 90 degrees in the 1-2-phase excitation method when the second control signal is input to the drive current generating unit 12. In the W1-2-phase excitation method, the electrical angle becomes 90 degrees when the fourth control signal is input to the drive current generating unit 12.

However, the input of the first control signal causes the rotor 2 to rotate. Thus, describing with the 1-2-phase excitation method, when the second control signal is input, the following formula shows a relative angle formed between the electrical angle and the rotation angle of the rotor 2.

$$45 \text{ degrees} \times 2 - \alpha \text{ degrees} \tag{1}$$

Here, "2" means the second, and "a" is a rotation amount of the rotor 2 until the second control signal is input.

The relative angle does not become 90 degrees due to generation of "α." Thus, when the second control signal is input, the torque does not become the maximum. When the amount of the "α" is large, the maximum torque may never be obtained until the operation of the stepper motor 1 terminates.

The input of the control signal causes the rotor 2 to rotate. Thus, this inevitably generates "α." Since "α" becomes large as time passes, "α" needs to be close to 0 (that is, the torque needs to be set to a value close to the maximum torque) when the second control signal is input, so as to reduce the period until the torque becomes the maximum. To achieve the above, for the 1-2-phase excitation method, it is only necessary to input the second control signal at the early timing. Additionally, for the W1-2-phase excitation method, it is only necessary to input the second to fourth control signals at the early timing.

According to a first aspect of the stepper motor control device 10 of the embodiment, in the 1-2-phase excitation method, the second control signal is input at the early timing. According to a second aspect of the stepper motor control device 10 of the embodiment, in the W1-2-phase excitation method, the second to fourth control signals are input at the respective early timings.

Figure 13:
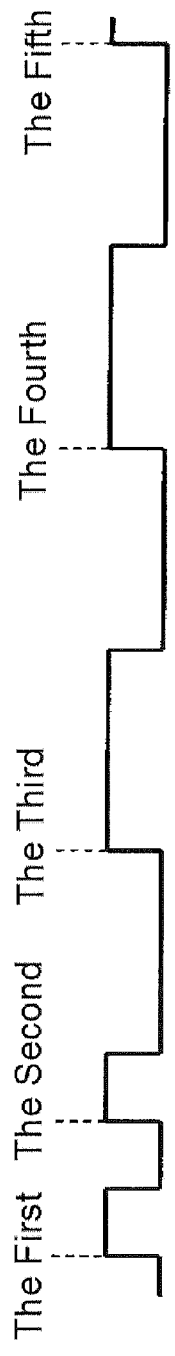
FIG. 13 illustrates a timing chart of a control signal generated by a control signal generating unit when an activation period starts in a first aspect of the embodiment.

First, the following describes the first aspect. FIG. 13 illustrates a timing chart of a control signal generated by the control signal generating unit 11 when an activation period starts in the first aspect. In the first aspect, the stepper motor 1, which drives in the 1-2-phase excitation method, has a higher pulse rate of the first to the second control signals in the activation period than a pulse rate of control signals following the second control signal.

Figure 14:
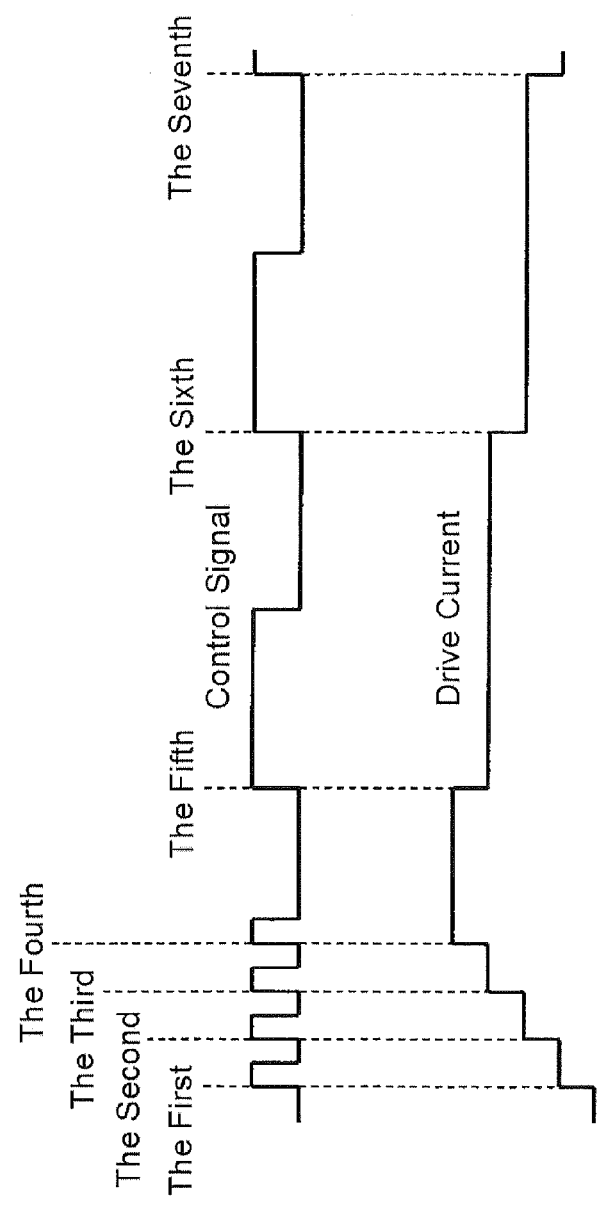
FIG. 14 illustrates a timing chart of a control signal generated by the control signal generating unit and a drive current generated by the drive current generating unit when an activation period starts in a second aspect of the embodiment.

FIG. 14 illustrates a timing chart of a control signal generated by the control signal generating unit 11 and a drive current generated by the drive current generating unit 12 when an activation period starts in the second aspect. In the second aspect, the stepper motor 1, which drives in the W1-2-phase excitation method, has a higher pulse rate of the first to the fourth control signals in the activation period than a pulse rate of control signals following the fourth control signal.

As described above, the first aspect configures a higher pulse rate of the first to the second control signals in the activation period than the pulse rate of the control signals following the second control signal, and then the second aspect configures a higher pulse rate of the first to the fourth control signals in the activation period than the pulse rate of the control signals following the fourth control signal. In the first aspect, when the second control signal is input, or in the second aspect, when the fourth control signal is input, this makes "α" close to 0 and thus ensures the reduced period until the torque becomes the maximum. According to the first aspect and the second aspect, the aspects ensure the improved performance of the stepper motor 1 during the activation period accordingly.

Figure 15:
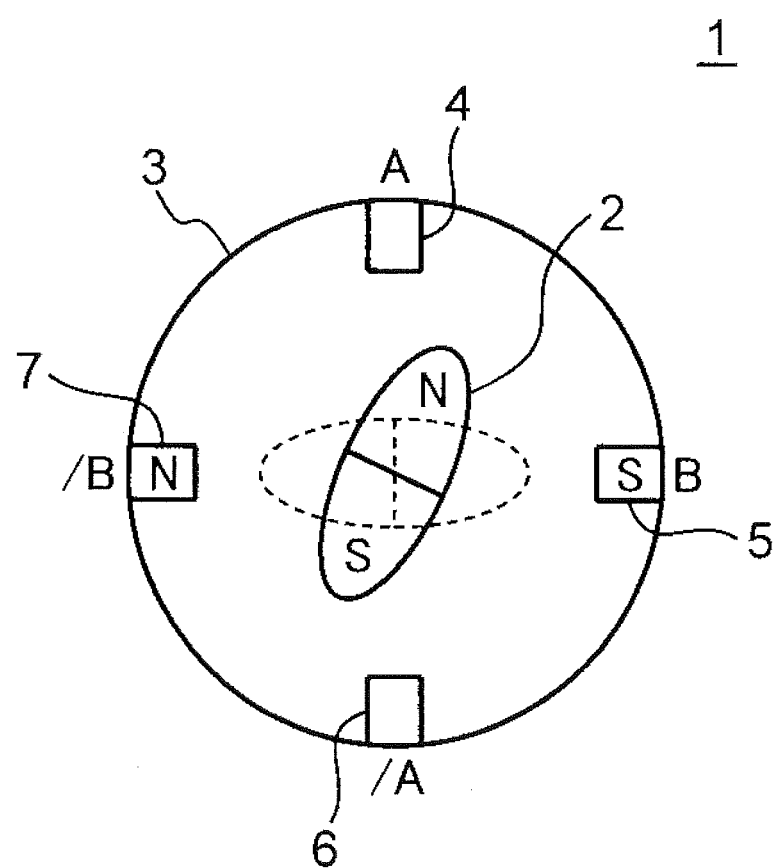
FIG. 15 schematically illustrates a state of the stepper motor when the second control signal is input to the drive current generating unit in the first aspect of the embodiment.

The following describes the reason why the stepper motor 1 does not step out even when the first aspect configures a high pulse rate of the first to the second control signals, and the second aspect configures a high pulse rate of the first to the fourth control signals. FIG. 15 schematically illustrates a state of the stepper motor 1 when the second control signal is input to the drive current generating unit 12 in the first aspect. As shown in the comparison between FIGS. 15 and 8, the high pulse rate of the first to the second control signals cause the rotor 2 not to follow a change of the excitation states of the magnetic poles of the stator 3 (a change of a phase of the stepper motor 1). However, in the 1-2-phase excitation method, as illustrates in FIGS. 7 and 8, the first control signal and the second control signal do not change a polarity of the B-phase magnetic pole 5 and a polarity of the /B-phase magnetic pole 7, and this ensures a rotation of the rotor 2 toward the balance point (the position of the rotor 2 illustrated by a dotted line in FIG. 15). This ensures the reduced occurrence of step-out.

FIG. 15 is also a schematic diagram illustrating a state of the stepper motor 1 when the fourth control signal is input to the drive current generating unit 12 in the second aspect. The high pulse rate of the first to the fourth control signals cause the rotor 2 not to follow a change of the excitation states of the magnetic poles of the stator 3. However, in the W1-2-phase excitation method, the second to the fourth control signals do not change the polarity of the B-phase magnetic pole 5 and the polarity of the /B-phase magnetic pole 7, and this ensures a rotation of the rotor 2 toward the balance point (the position of the rotor 2 illustrated by the dotted line in FIG. 15). This ensures the reduced occurrence of step-out.

The reason why the first aspect and the second aspect do not cause the step-out may be described with the following reason. This reason is also the reason why a third aspect and a fourth aspect do not cause the step-out, described later. The following describes the reason using an example of the first aspect. The following formula indicates the relative angle formed between the electrical angle and the rotation angle of the rotor 2 when the N-th control signal is input in the 1-2-phase excitation method.

$$45 \text{ degrees} \times N - \alpha \text{ degrees} \qquad (2)$$

As long as 0<N<4, the relative angle does not exceed 180 degrees. Considering this and the graph illustrated in FIG. 12, generation of the positive torque continues until the fourth control signal is input after the start of the activation period. This ensures the reduced occurrence of step-out.

The following describes the third aspect and the fourth aspect of the stepper motor control device 10 according to the embodiment. The third aspect and the fourth aspect ensure the reduced sound noise of the stepper motor 1 during the activation period of the stepper motor 1.

Typically, a high pulse rate of a stepper motor reduces a sound noise of the stepper motor. A low pulse rate of the stepper motor causes a loud sound noise. A stepper motor control device gradually sets a pulse rate in a high value from a low value in an activation period to accelerate the stepper motor. The activation period consequently includes a period of a low pulse, and thus a countermeasure of the sound noise is desired.

Figure 16:
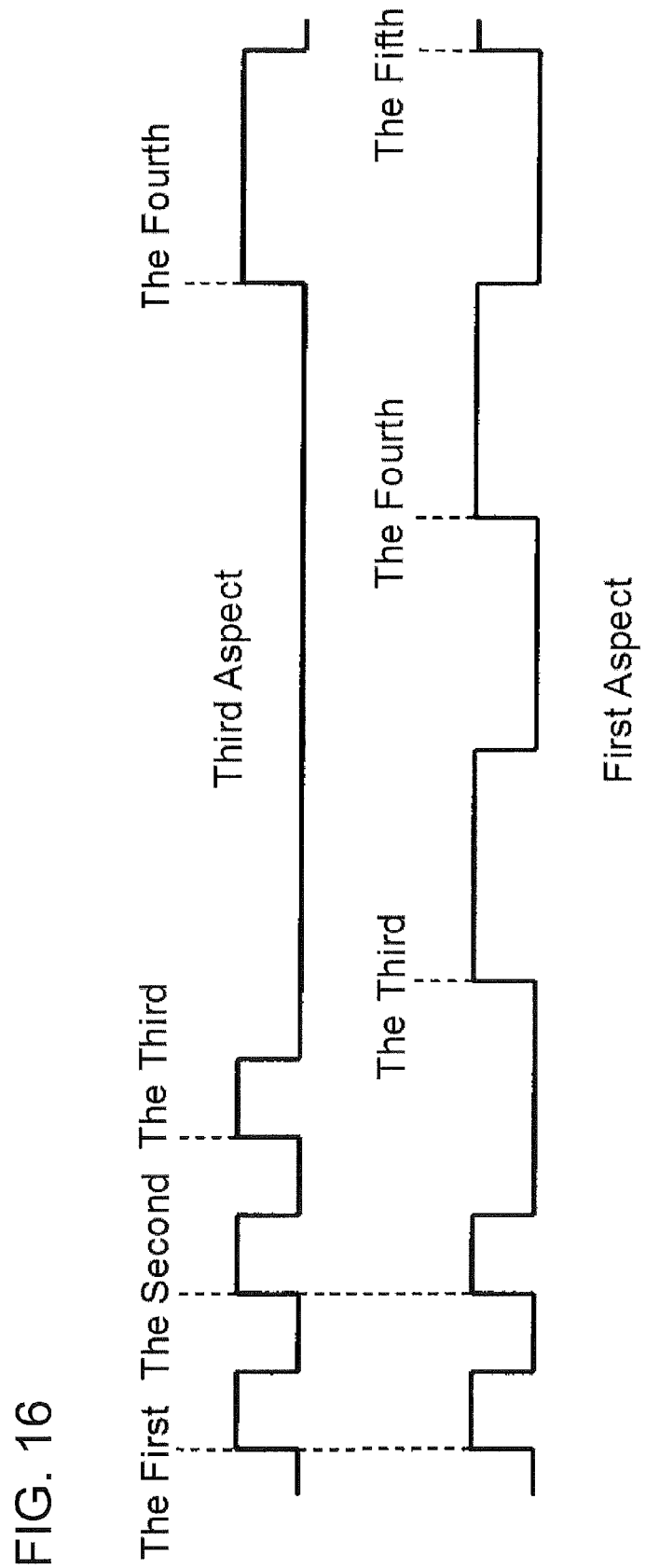
FIG. 16 illustrates a timing chart of a control signal generated by the control signal generating unit when an activation period starts in the first aspect and a third aspect of the embodiment.

First, the following describes the third aspect. The third aspect drives the stepper motor 1 in the 1-2-phase excitation method. FIG. 16 illustrates a timing chart of a control signal generated by the control signal generating unit 11 when an activation period starts in the first aspect and the third aspect. As described above, in the first aspect that drives the stepper motor 1 in the 1-2-phase excitation method, the control signal generating unit 11 configures a higher pulse rate of the first to the second control signals in the activation period than the pulse rate of the control signals following the second control signal.

In contrast to this, in the third aspect, the control signal generating unit 11 configures a higher pulse rate of the first to the third control signals in the activation period than the pulse rate of control signals following the third control signal. Inputting the first control signal, the second control signal, and the third control signal to the drive current generating unit 12 causes the electrical angles to become 45 degrees, 90 degrees, and 135 degrees, respectively.

Figure 17:
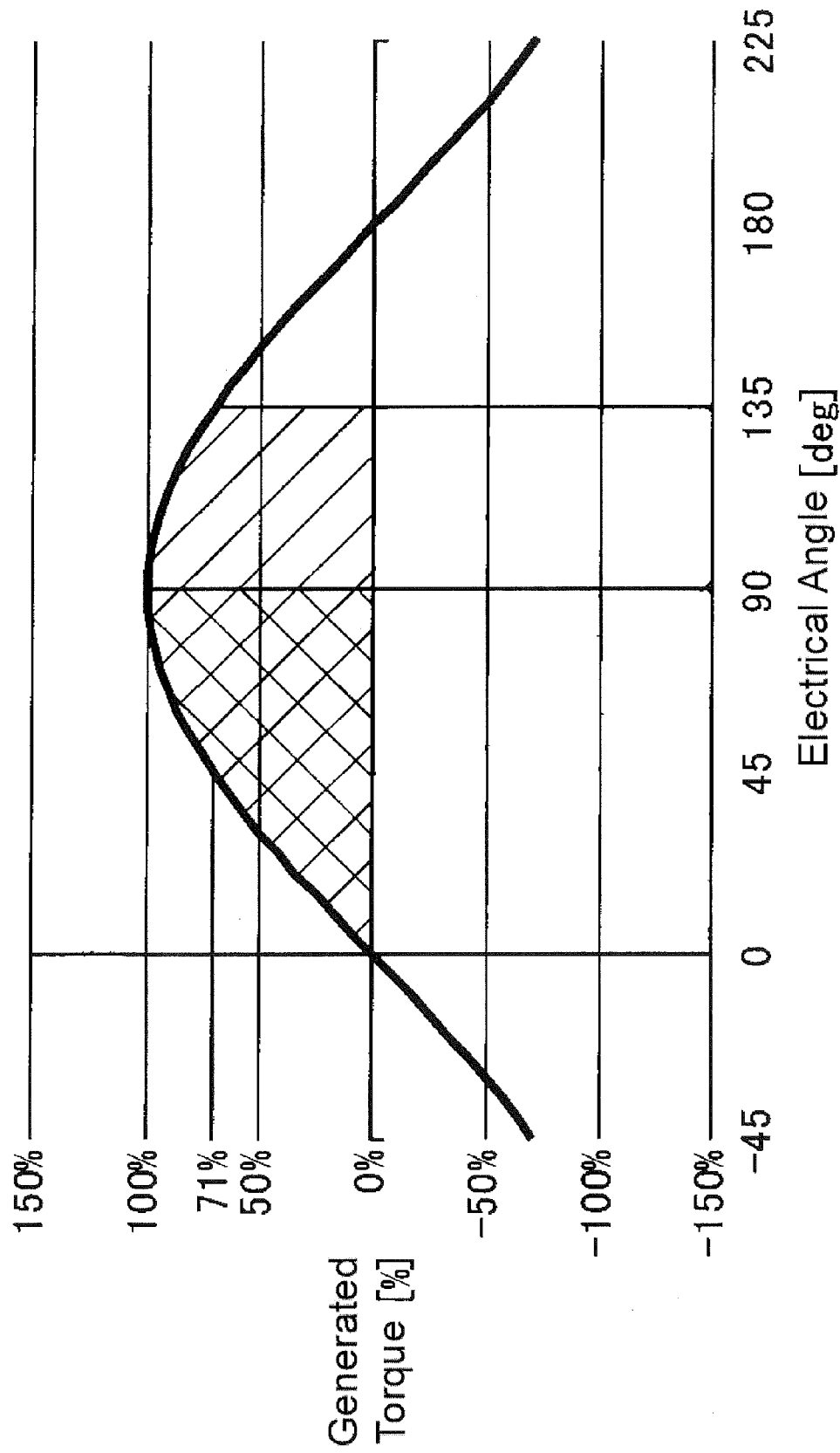
FIG. 17 illustrates a graph showing a relationship between a generated torque of the stepper motor and an electrical angle.

FIG. 17 illustrates a graph showing a relationship between a generated torque of the stepper motor 1 and the electrical angle. A horizontal axis, a vertical axis, and a graph waveform, which are in the graph illustrated in FIG. 17, are identical to those of FIG. 12. As illustrated in FIG. 16, immediately after the start of the activation period, the third aspect includes a short period of a state where the electrical angle is 90 degrees, continues a state of the electrical angle of 135 degrees, and this causes the electrical angle immediately after the start of the activation period to be 135 degrees. In contrast to this, immediately after the start of the activation period, the first aspect continues a state of the electrical angle of 90 degrees, and this causes the electrical angle immediately after the start of the activation period to be 90 degrees. In view of this, in the third aspect, the torque immediately after the start of the activation period is 71% of the first aspect.

An integral value of the graph illustrated in FIG. 17 indicates a speed of the rotor 2 (a speed of the stepper motor 1) at the stable point between the rotor 2 and the stator 3. The electrical angle of 135 degrees ensures a fast speed of the rotor 2 at the stable point compared with the electrical angle of 90 degrees. This causes an acceleration of the stepper motor 1 to continue when the third control signal is input to the drive current generating unit 12, and even if the fourth control signal is not input to the drive current generating unit 12 for a while (even when the phase of the stepper motor 1 is not switched). Accordingly, the third aspect ensures a short period of a low pulse rate during the activation period compared with the first aspect, and this ensures the reduced sound noise during the activation period compared with the first aspect. With the third aspect, the aspect ensures the improved performance of the stepper motor 1 during the activation period accordingly.

Figure 18:
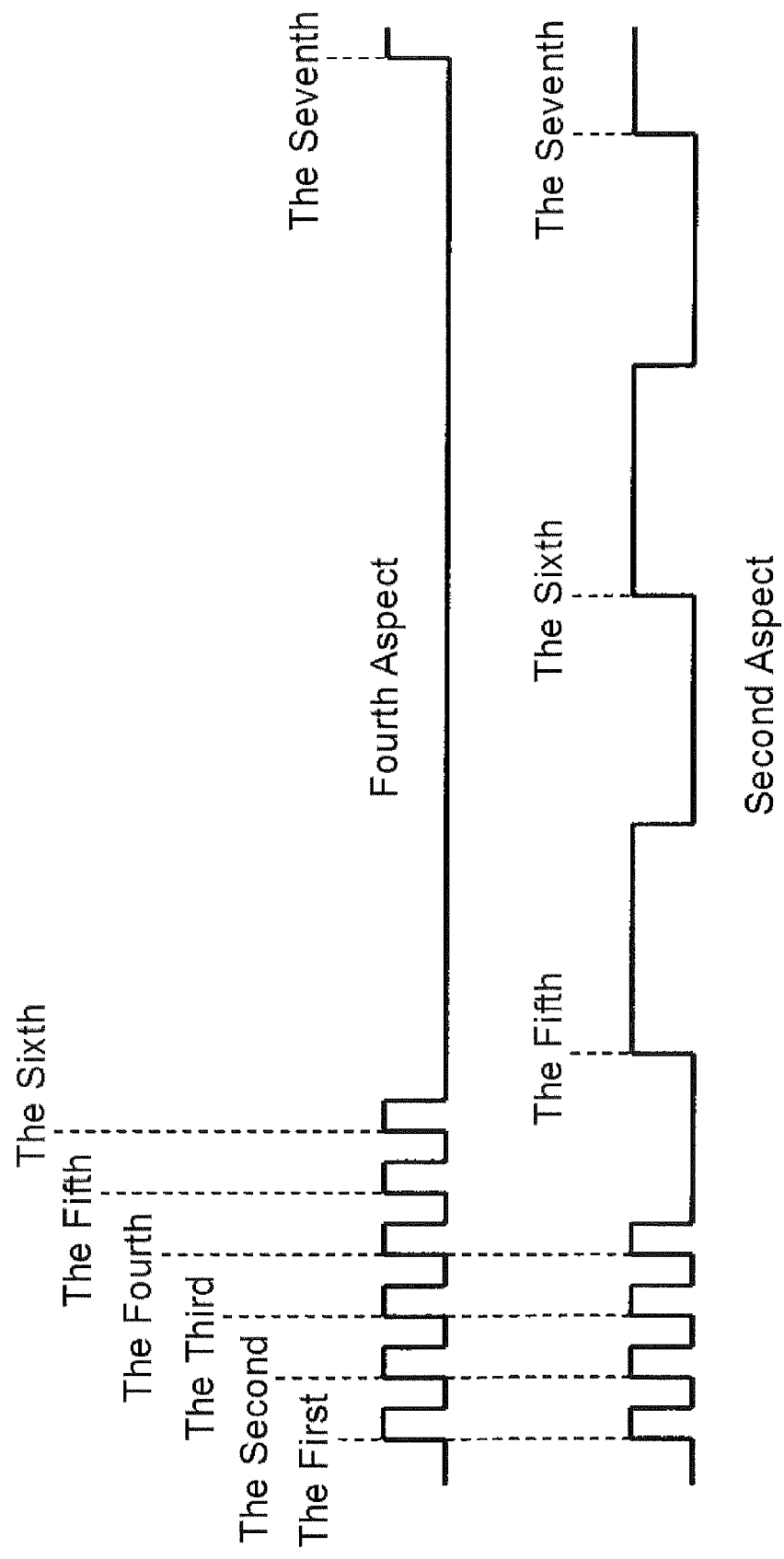
FIG. 18 illustrates a timing chart of a control signal generated by the control signal generating unit when an activation period starts in the second aspect and a fourth aspect of the embodiment.

The following describes the fourth aspect. The fourth aspect drives the stepper motor 1 in the W1-2-phase excitation method. FIG. 18 illustrates a timing chart of a control signal generated by the control signal generating unit 11 when an activation period starts in the second aspect and the fourth aspect. As described above, in the second aspect that drives the stepper motor 1 in the W1-2-phase excitation method, the control signal generating unit 11 configures a higher pulse rate of the first to the fourth control signals in the activation period than a pulse rate of control signals following the fourth control signal.

In contrast to this, in the fourth aspect, the control signal generating unit 11 configures a higher pulse rate of the first to a sixth control signals in the activation period than a pulse rate of control signals following the sixth control signal. Inputting the first control signal, the second control signal, the third control signal, the fourth control signal, the fifth control signal, and the sixth control signal to the drive current generating unit 12 causes the electrical angles to be 22.5 degrees, 45 degrees, 67.5 degrees, 90 degrees, 112.5 degrees, and 135 degrees, respectively.

The control signal generating unit 11 may configure a higher pulse rate of the first to the fifth control signals in the activation period than a pulse rate of control signals following the fifth control signal, and may configure a higher pulse rate of the first to the seventh control signals in the activation period than a pulse rate of control signals following the seventh control signal.

With reference to FIG. 17, immediately after the start of the activation period, the fourth aspect includes a short period of a state where the electrical angle is 90 degrees (the electrical angle of 22.5 degrees×four pieces of control signals) and continues a state of the electrical angle of 135 degrees (the electrical angle of 22.5 degrees×six pieces of control signals), and this causes the electrical angle immediately after the start of the activation period to be 135 degrees. In contrast to this, immediately after the start of the activation period, the second aspect continues a state of the electrical angle of 90 degrees, and this causes the electrical angle immediately after the start of the activation period to be 90 degrees. In view of this, in the fourth aspect, the torque immediately after the start of the activation period is 71% of the second aspect.

However, the fourth aspect ensures the reduced sound noise during the activation period compared with the second aspect due to a reason identical to the relationship between the first aspect and the third aspect. With the fourth aspect, the aspect ensures the improved performance of the stepper motor 1 during the activation period accordingly.

The stepper motor 1 is employed for a mechanism that sends an original document (a mechanism that conveys an original document) included in an automatic document feeder (ADF) of an image forming apparatus and a mechanism that moves a carriage (a carriage installed in, for example, an exposing lamp) included in a document reading unit. The automatic document feeder and the document reading unit are close to a position of a user, and this requires a countermeasure against the sound noise of the stepper motor 1. In this case, the third aspect and the fourth aspect are effective.

In the first to the fourth aspects, as the examples of the higher pulse rate of the first to the n-th control signals in the activation period than a pulse rate of control signals following the n-th control signal, there are following two examples.

The control signal generating unit 11 configures a higher converted value, in which the pulse rate of the first to the n-th control signals is converted into a frequency of the control signal, than the maximum self-activating frequency of the stepper motor 1. The maximum self-activating frequency is the maximum frequency generated by the control signal generating unit 11 and is synchronized with the control signal input to the drive current generating unit 12, so as to ensure control of activation of the stepper motor 1 from a motionless state, normal rotation, and reverse rotation.

The control signal generating unit 11 configures a higher pulse rate of the first to the n-th control signals than a pulse rate of a control signal in a constant speed operation of the stepper motor 1. The stepper motor control device 10 assumes a sequence control of a slow-up, a constant speed operation and a slowdown with respect to the stepper motor 1.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A control device for a stepper motor that drives in a 1-2-phase excitation method in response to an input of a drive signal, comprising:
   a control signal generating unit that generates a pulsed control signal; and
   a drive signal generating unit that generates the drive signal for rotating by a predetermined step angle every time the control signal is input, the predetermined step angle being a half of a step angle of a 2-phase excitation method,
   wherein the control signal generating unit configures a higher pulse rate of a first to an n-th (n is an integer equal to or more than 2 and equal to or less than 3) control signals at a start of an activation period of the stepper motor than a pulse rate of the control signals following the n-th control signal, and
   the control signal generating unit configures a higher converted value than a maximum self-activating frequency of the stepper motor, the converted value being the pulse rate of the first to the n-th control signals converted into a frequency of the control signal.

2. The stepper motor control device according to claim 1, wherein the n is 2.

3. The stepper motor control device according to claim 1, wherein the n is 3.

4. The stepper motor control device according to claim 1, wherein the control signal generating unit configures a higher pulse rate of the first to the n-th control signals than a pulse rate of the control signal in a constant speed operation of the stepper motor.

5. A control device for a stepper motor that drives in a W1-2-phase excitation method in response to an input of a drive signal, comprising:
   a control signal generating unit that generates a pulsed control signal; and
   a drive signal generating unit that generates the drive signal for rotating by a predetermined step angle every time the control signal is input, the predetermined step angle being a quarter of a step angle of a 2-phase excitation method,
   wherein the control signal generating unit configures a higher pulse rate of a first to an n-th (n is an integer equal to or more than 4 and equal to or less than 7) control signals at a start of an activation period of the stepper motor than a pulse rate of the control signals following the n-th control signal, and
   the control signal generating unit configures a higher converted value than a maximum self-activating frequency of the stepper motor, the converted value being the pulse rate of the first to the n-th control signals converted into a frequency of the control signal.

6. The stepper motor control device according to claim 5, wherein the n is 4.

7. The stepper motor control device according to claim 5, wherein the n is an integer equal to or more than 5 and equal to or less than 7.

* * * * *